Figure 1:
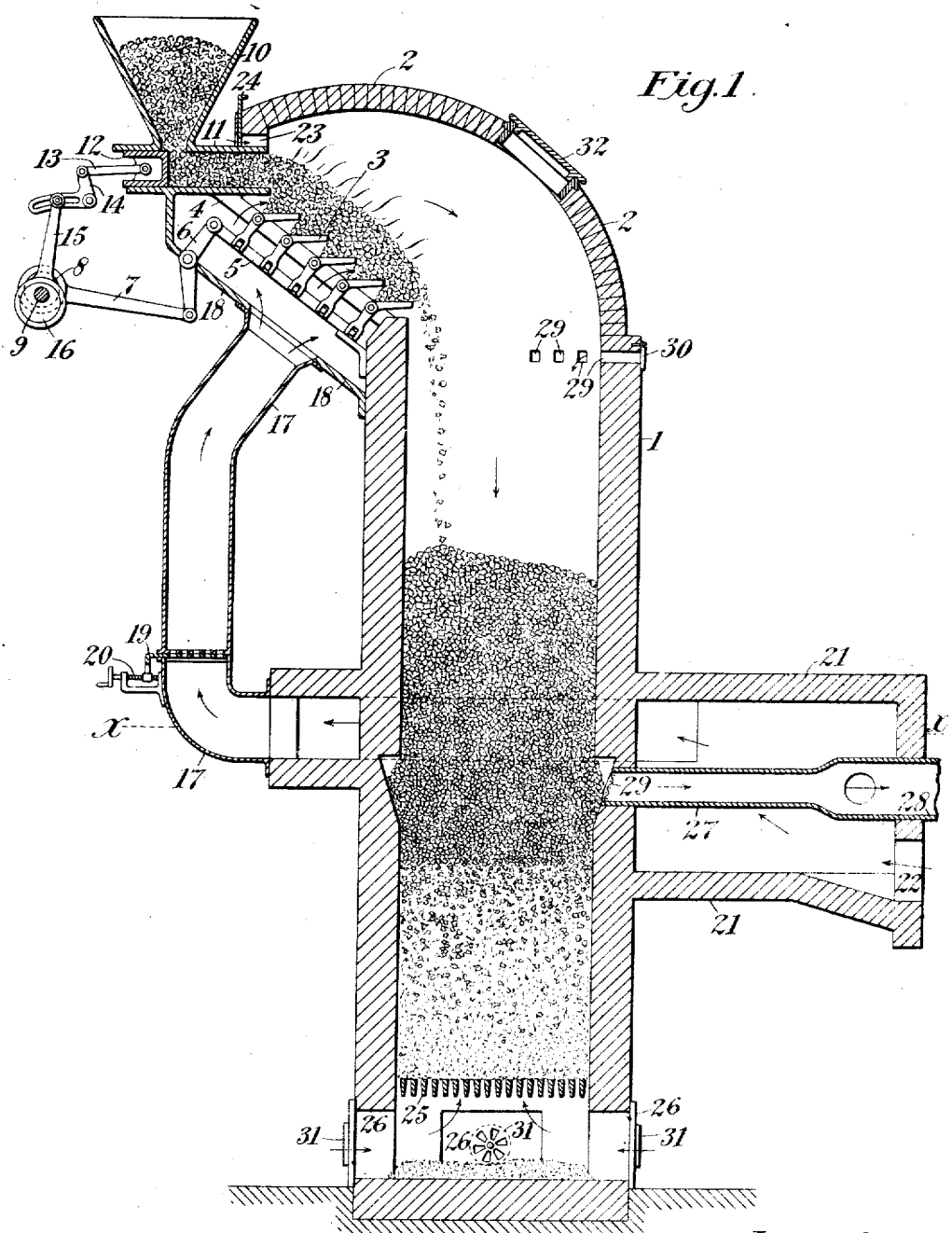

C. E. LUCKE.
GAS PRODUCER.
APPLICATION FILED OCT. 30, 1907.

914,663.

Patented Mar. 9, 1909.
2 SHEETS—SHEET 2.

Witnesses:

Inventor:
Charles E. Lucke
by Henry D. Williams
Attorney.

UNITED STATES PATENT OFFICE.

CHARLES E. LUCKE, OF NEW YORK, N. Y.

GAS-PRODUCER.

No. 914,663.         Specification of Letters Patent.         Patented March 9, 1909.

Application filed October 30, 1907. Serial No. 399,801.

*To all whom it may concern:*

Be it known that I, CHARLES E. LUCKE, a citizen of the United States, residing in the borough of Manhattan, city of New York, in the county of New York and State of New York, have invented a certain new and useful Improvement in Coal-Gas Producers, of which the following is a specification, reference being had therein to the accompanying drawings, forming part thereof.

My invention relates particularly to the manufacture of gases suitable for use in gas engines, and my invention has for its object the economical production of a gas having a high efficiency as a gas engine fuel and free from substances detrimental to the operation of the engine, and having a composition particularly suited to gas engine requirements.

A more particular object of my invention is to produce from caking bituminous coal a gas which is rich in carbon monoxid comparatively poor in hydrogen, free from tarry vapors and other hydrocarbons, and of great constancy of composition.

My invention includes means for passing air through and over an ignited fuel bed in limited and regulated or adjusted quantities, to distil and completely oxidize the volatile fuel constituents, and means for passing the gaseous products of complete combustion through a second and incandescent fuel bed which is formed from the partly consumed fuel taken from the first fuel bed, the second bed being distinct from the first bed and entirely separated therefrom and the two beds being so related that unconsumed gases from the first fuel bed, or gases which are not completely oxidized, will be completely oxidized before reaching the second fuel bed, whereby the exothermic and the endothermic reactions are entirely separated and the gaseous products of complete combustion and the incandescent unconsumed fuel unite to form fixed combustible gases adapted to the desired purposes.

My invention also includes means for continuously agitating the first or high temperature fuel bed. to prevent caking of the fuel and to permit the free passage of air through the fuel.

My invention also includes several details of construction and advantageous features as hereinafter described.

In practice two principal difficulties are encountered in gasifying caking bituminous coal. The first is the fact that the coal cakes in the producer chamber and interferes with the gasifying operation by preventing air from passing through the fuel bed. The other difficulty lies in the fact that the gas produced contains a considerable quantity of tar. The presence of tar is especially objectionable in gas for use in gas engines because it interferes with the proper operation of the engine. Another common difficulty is that continuity of operation is interfered with by ash and clinker removal, resulting in irregularity in quality of gas produced, due to varying proportions of hydrogen and volatile gases.

The only remedy practiced for caking has been the employment of down draft producers and the breaking up of the caked fuel from the top by means of bars. Attempts have been made to remove the tar from the gas by mechanical means, for example, by "purifying" and "washing"; also attempts have been made to split the tar into fixed gases by passing it through a high temperature zone in the fuel bed; but in either of these practices the result is always imperfect and some tarlike material remains in the gas.

In carrying out my present invention the coal is fired on a grate located at the top of a producer chamber, and the burning coal is fed across the grate and allowed to drop into the lower part of the chamber where it forms a second bed of incandescent coke. The grate at the top of the producer chamber may be substantially the same, *per se*, as is ordinarily used under steam boilers and may be a mechanical stoker, as is shown in the accompanying drawings. Air is supplied to the grate fire both at the top and bottom in adjusted proportions and in limited quantities just sufficient to distil and entirely burn or completely oxidize the volatile gases and the tar. The process proceeds by its own heat of combustion, the coal at this stage being reduced to gaseous products of complete combustion and coke. If desired enough additional air may be admitted to burn some of the coke at this stage or to partly burn all of the coke. Green or fresh coal is continuously fed to one side or part of the grate while incandescent coke or coke and cinders are discharged from the other side or part of the grate and fall to the second bed at the bottom of the producer chamber. All of the unconsumed or unoxidized solid portions of the fuel are thus transferred or removed to the second fuel bed. At the same time, as the result of the combustion of the volatile parts of the coal and possibly of some of the coke, a steady stream of gaseous products of complete combustion will flow from the surface of the grate fire. These gaseous products are completely oxidized, containing no unburned material, and consist chiefly of carbon dioxid, steam, nitrogen and possibly a small quantity of free oxygen. These completely oxidized gaseous products of the grate fire are passed downward through the incandescent coke bed which is built up at the bottom of the producer chamber by the discharge from the grate above. The top of this coke bed must be far enough below the upper fuel bed to prevent unconsumed gases or the flame of gaseous fuel between the two beds from reaching or extending to the coke bed, thereby securing complete combustion or complete oxidation of the gases distilled from the first or upper fuel bed before the second bed or lower bed of incandescent coke is reached. Final gas outlets are located below the top of the coke bed, and the producer is operated by suction at these final outlets. When the completely oxidized gaseous products from the upper bed pass through the incandescent coke bed, hydrogen is produced from the steam, by well known endothermic action, and carbon monoxid is produced from the carbon dioxid and the carbon of the coke, and these stable or fixed combustible gases are delivered to the final gas outlets. Merely as a matter of regulation, air inlets are provided to introduce air into the producer chamber between the two fuel beds and into the gaseous products of combustion from the first bed, to keep up the temperature of the coke bed to the gasifying point, but it is thought usually such intermediate air supply will not be necessary. Also merely for regulation under varying conditions, air may be admitted underneath the lower bed of incandescent coke, to gasify any coke which may have escaped gasification and passed below the gas outlets, but it is also thought that ordinarily this underneath air supply will not be needed.

An embodiment of my invention by which the process may be carried out will now be described with reference to the accompanying drawings, after which I will point out my invention in claims.

Figure 2:
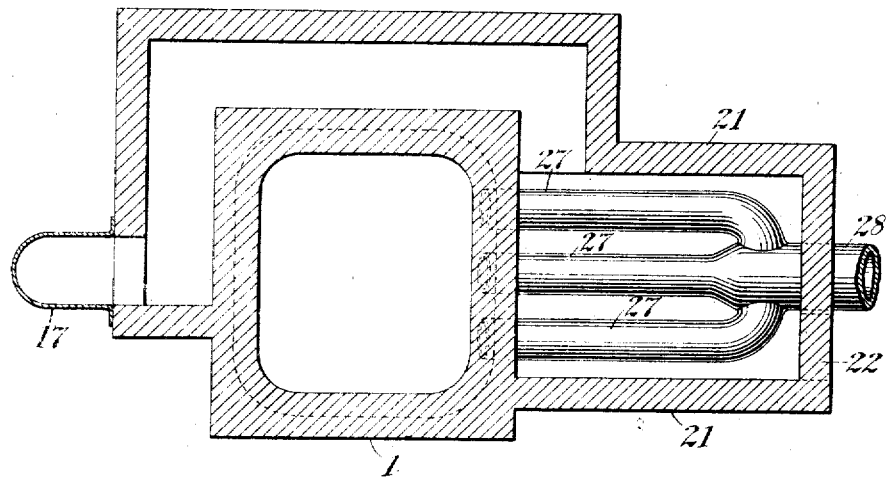

Figure 1 is a median vertical section of a gas producer adapted to carry out my invention. Fig. 2 is a sectional plan on the line x—x of Fig. 1.
The illustrated embodiment of my invention comprises a vertically arranged producer chamber having an upright body portion 1 and an arched top 2. The construction shown is especially intended for gasifying caking bituminous coal. The coal is first ignited on a grate shown as comprising a mechanical stoker. The grate arrangement or construction of stoker shown is well known as applied to the furnaces of steam boilers. Pivoted grates or grate sections 3 are arranged in the form of a terrace or in successive steps, the grate shelves being pivoted to an inclined support 4. The coal is continuously agitated and fed downward and across the grates by rocking or shaking the grates 3. Rocking movement may be imparted to the grates by a link 5 common to all the grate sections 3 and to which is pivotally connected a rocking lever 6, which in turn is actuated by a pitman 7 and eccentric 8 carried by a continuously rotating shaft 9. The coal is not completely consumed in this upper fuel bed, and when the partly consumed coal or coke reaches the inner edge or lower edge of the grate it falls to the bottom of the producer chamber and there accumulates to form a second fuel bed of incandescent coke. The grate steps 3 are so constructed and arranged as to prevent any of the fuel thereon from falling through to the back thereof, but all of the unoxidized solid portions of the fuel, including ash and cinders if any, are dropped to the lower bed or second bed. As fast as the coal in its coked or partly consumed form is dropped from the lower and inner edge of the grate of the stoker it is replenished with green or fresh coal continuously supplied to the upper and outer edge of such stoker grate.

The means for supplying or feeding fuel to the grate comprises a fuel hopper 10 and a horizontal discharge tube or chute 11 leading from the hopper and opening or discharging upon the uppermost of the grate sections 3. The coal descends by gravity from the hopper 10 into the horizontal chute 11 and is fed through the chute 11 to replenish the fuel bed on the grates 3. The means for feeding the coal through the chute 11 are shown as comprising a reciprocating plunger 12 fitting in the chute 11 contiguous to the outlet opening of the hopper 10. The feed plunger 12 is adapted to be reciprocated by a link 13 pivotally connected thereto and to a bell crank lever 14. The bell crank lever 14 is actuated by a pitman 15 and eccentric 16 carried by the continuously rotating shaft 9. The pitman 15 is adjustable radially on the bell crank lever 14 by means of a slot as shown, and the rate of feed of fuel may be controlled by adjusting the pitman 15 along the slot to different positions radially to the fulcrum pivot of the bell crank lever, to thereby give a longer or shorter stroke to the feed plunger 12.

Air is supplied to the burning coal on the grates in substantially the same manner that it is usually supplied to an ordinary grate fire under a steam boiler, but in the present instance the air supply is limited and regulated so as to secure the desired result of complete combustion of the volatile fuel constituents only, or of more or less partial combustion of the non-volatile constituents also, accordingly as desired. The greater part of the air is supplied beneath the grates 3 and passes through the grates and through the burning coal contained thereon. The means for supplying air beneath the grates comprise an air passage or air conduit 17 shown as opening into an air space or chamber formed below the grates by a casing 18. The quantity of air passing through the burning fuel may be regulated by a damper 19 in the conduit or passage 17. The means shown for actuating the damper 19 comprise a manually actuatable screw 20. The air conduit 17 obtains air from a preheating chamber 21 having an atmospheric air inlet 22.

Combustion of the volatile fuel constituents will for the most part take place within the upper fuel bed, but there will be some volatile vapors distilled near the surface of the bed and especially from the greener portions of the fuel and which will escape unconsumed from the surface of the fuel bed. Under some conditions of operation sufficient air may not pass through the fuel bed to completely oxidize or entirely burn these escaping vapors, therefore provision is made for admitting air immediately above the fuel bed when desired. The means provided for this purpose comprise an air inlet opening 23 located at the front of and just above the fire on the grates 3. The air inlet opening 23 is controlled by damper 24 which may be adjusted to regulate the amount of air admitted at this point.

The incandescent partly consumed coal or coke which falls from the upper fuel bed is received at the bottom of the producer chamber on an ordinary grate 25 disposed at a distance above the bottom of the chamber sufficient to provide an ash pit as shown beneath the grate 25, several openings being provided for the removal of the ashes and closed by doors 26. At some distance above the grate 25 a number (shown as three) of final gas outlets or discharge tubes 27 communicate with the producer chamber and unite to form a service conduit 28 which may lead to any point of use or storage of the gas. The entrances to the discharge tubes 27 are shown as provided with screens 29 to prevent the entrance thereto of coke or cinders from the producer chamber. The body 1 of the producer chamber is preferably provided with an undercut groove forming a ring discharge as shown. The preheating chamber 21 surrounds the gas discharge tubes 27 and serves the double purpose of heating the air supplied to the under surface of the upper fuel bed and of cooling the discharge gas.

In operation the incandescent coke which falls from the grates of the upper fuel bed accumulates on the lower grate 25 and forms a second or lower fuel bed of a depth extending for some distance above the final gas outlets 27. The producer is operated by suction applied to the service conduit 28. The air admitted through the air inlet conduit 17 and damper 19 passes through the upper ignited fuel bed, and the air, if any, admitted through the damper 24 passes immediately over such fuel bed, and all of the volatile fuel constituents, such, for example, as tar and volatile gases, are distilled and completely oxidized or entirely burned. These completely oxidized gases or gaseous products of complete combustion pass downward and through the incandescent bed of coke, on their way to the final gas outlets 27. In the second bed the combustible constituents of the second bed and the gaseous products of complete combustion from the first bed chemically unite to form fixed combustible gases. It should be particularly noted that these gaseous products of complete combustion comprise volatile distillates, including tarry vapors which have chemically united with the full quantity of oxygen which they are capable of taking up and are, therefore, not only fixed but are dead and inert. This absolutely precludes the possibility of the presence of tar in the final product of combustible gas delivered for use, for the reason that all tarry distillates are destroyed before the building up of the final product of fixed combustible gas is begun, and at a point or location that is isolated or distinctly separated from the location where the final gaseous product is formed. The upright body portion 1 of the producer is long enough or extends far enough above the top of the second fuel bed to permit all of the vapors or volatile fuel constituents to become completely oxidized in the space between the two fuel beds and thereby to prevent any unconsumed gases or vapors from reaching the bed of incandescent coke. The extent of the combustion at the first fuel bed should always be sufficient to entirely consume all of the volatile constituents of the fuel; and if found desirable in any particular instance enough additional air may be admitted to consume also some of the non-volatile constituents, that is to burn and reduce some of the coke to cinders or to ashes. Should some air pass through the first fuel bed no harm whatever would result. Also incidentally it should be noted as possible that sometimes the temperature of the first or upper fuel bed may become high enough to disassociate or decompose some of the steam into separate hydrogen and oxygen.

To meet particular exigencies and conditions of service means are provided for admitting air into the gaseous products of combustion between the two fuel beds. Such means comprise air inlet openings 29 in the upright or vertical body 1 of the producer at a point below the grates 3. The air inlets 29 are controlled by dampers 30 which may be opened or closed more or less as desired. Under most conditions it is thought it will not be necessary to admit any air whatever through the dampers 30 and inlets 29, but should it be necessary to raise the temperature of the lower fuel bed air may be thus admitted. The dampers 30 therefore serve merely for the purpose of regulation. Provision is also made for admitting air beneath the lower fuel bed, to effect regulation and effect perfect operation under special conditions, but it is thought that ordinarily it will be unnecessary to admit air at this point. The means provided for admitting air below the lower fuel bed comprise dampers 31 located in the ash pit doors 26. Air is admitted through the dampers 31 to gasify any coke that may have passed below the gas outlets. This assures complete gasification of the coke at the bottom. Air admitted at the bottom of the chamber will act on the coke in the same manner as it is acted on in an ordinary producer. The action of the producer in producing gas will be continuous during ash removal, because as the ashes are taken out the coke bed will settle down below the gas outlets and operate as above described. Suction at the gas discharge conduit will draw in air through whatever dampers may be at the time open and in quantities corresponding to the extent to which the dampers are open.

Although caking and clinkering are reduced to a minimum, yet it is best to have means for poking the fuel beds. Accordingly such means are provided and comprise a poking cover 32 located in the inclined portion of the top 2. The cover 32 may be opened to poke either the upper bed of burning coal or the lower bed of incandescent coke. The poking will not interfere with the continuous production of gas, and this is of advantage, because an engine fed by the producer may continue to operate. When the cover 32 is open the lower part or main body of the producer chamber acts in the same manner as an ordinary producer.

The action taking place at the upper fuel bed and in the gas region between the fuel beds is exothermic or heat producing and the action taking place at the lower fuel bed is endothermic or heat consuming and these exothermic and endothermic reactions are completely separated so that all gases which enter the lower fuel bed are in a condition or state of complete oxidation before reaching the lower bed or coke bed. The coke bed has no high temperature carbon dioxid formation zone, but, on the contrary, constitutes a reduction zone solely having a lower temperature; therefore there is no tendency to clinker or to burn the lining and no possibility of burning gas formed by air leaks as in single bed producers. The temperature of the main bed or coke bed is maintained by incandescent accretions from the first bed and by the heat of the gaseous products of complete combustion from the first bed, all of which have a high temperature and which add their sensible heat to maintain the temperature of the coke bed. The high temperature carbon dioxid zone is at the first or upper fuel bed. On account of the complete separation of the exothermic and the endothermic reactions the gasifying temperature may be kept down without the addition of much if any steam, giving a gas containing less hydrogen and correspondingly richer in carbon monoxid. Hydrogen, as is well known, has properties rendering it to some extent objectionable as a gas engine fuel. Also the final gaseous product will contain no gaseous hydrocarbons, and, of more importance yet, will be substantially constant in composition. The gas formed is particularly suited to the requirements of gas engines, having a low heating value and no illuminating value.

Air stoppage from caking in the upper fuel bed is substantially obviated by the continual agitation of the burning fuel by the continuously rocking grates. On account of the reduced tendency to clinker the producer may be operated for longer periods than is usual. The air passing through and over the upper fuel bed completely oxidizes or entirely burns the volatile constituents of the fuel, and the heat generated by this combustion raises to a high temperature both the gaseous products of complete combustion and the non-volatile fuel constituents, the latter consisting mostly of coke which is heated to incandescence. It is evident from the above description that the operation of the producer is continuous.

The principal characteristics of my invention are the complete separation of the exothermic and the endothermic reactions and the production of the first or exothermic reaction by the admission of air in proper regulated quantities, including the passing of air in limited and regulated quantities through the first fuel bed; and the principal advantages of my invention are obviating caking, and freedom from tar of the gas produced and the production of a gas which is very constant in composition. A further great advantage is the complete control of all the chemical and mechanical processes.

It is obvious that various modifications may be made in the construction shown and above particularly described within the principle and scope of my invention.

I claim:—

1. A gas producer comprising a container, means for forming a fuel bed at one location, means for substantially continuously feeding fuel to the bed, adjustable means for controlling the rate of feed of the fuel, means for substantially continuously agitating the fuel during combustion, adjustable means for supplying air to the fuel bed in regulated quantities, means for removing all of the unoxidized portions of solid fuel from the fuel bed to another location to form at the second location a second fuel bed distinctly separated from the first bed and so related thereto that substantially all unconsumed gases from the first bed will be completely oxidized before reaching the second bed, and means for compelling the completely oxidized gases from the first bed to pass through the second fuel bed.

2. A gas producer comprising a chamber, a grate in the chamber at the top of the chamber, means for substantially continuously feeding fuel to the grate, adjustable means for controlling the rate of feed of the fuel, means for substantially continuously agitating the fuel during combustion, adjustable means for supplying air through the grate in regulated quantities, means for passing all of the partly consumed solid fuel from the grate to a separate fuel bed at the lower part of the chamber and so distinctly separated from the first bed as not to be reached by gases from the grate fire which have not yet been completely oxidized, and means for passing the completely oxidized gaseous products of combustion from the grate fire through the bed of partly consumed solid fuel at the bottom of the chamber.

3. A gas producer comprising a chamber, means for forming a fuel bed at the top of the chamber, means for substantially continuously feeding fuel to the bed, adjustable means for controlling the rate of feed of the fuel, means for substantially continuously agitating the fuel during combustion, adjustable means for passing air in regulated quantities through the burning fuel, means for passing all of the partly consumed fuel from the bed to the lower part of the chamber to form there a second fuel bed so distinctly separated from the first fuel bed that substantially all unconsumed gases from the first fuel bed will be completely oxidized before reaching the second bed, and means for passing the completely oxidized gaseous products of combustion of the first bed through the second bed.

4. A gas producer comprising a chamber, means for forming a fuel bed at the top of the chamber, means for substantially continuously feeding fuel to the bed, adjustable means for controlling the rate of feed of the fuel, means for substantially continuously feeding all of the unconsumed solid fuel across the bed and dropping it all to the lower part of the chamber to form there a second fuel bed, distinctly separated from the first bed and so related thereto that substantially all unconsumed gases from the first bed will be completely oxidized before reaching the second bed, adjustable means for passing air in regulated quantities through the first bed, means for passing air in regulated quantities over the first bed, and means for passing the completely oxidized gaseous products of combustion of the first bed through the second bed.

5. A gas producer comprising a chamber, means for forming a fuel bed at the top of the chamber, means for substantially continuously feeding fuel to the bed, adjustable means for controlling the rate of feed of the fuel, means for substantially continuously feeding all of the unconsumed solid fuel across the bed and dropping it all to the lower part of the chamber to form there a second fuel bed distinctly separated from the first bed and so related thereto that substantially all unconsumed gases from the first bed will be completely oxidized before reaching the second bed, adjustable means for passing air in regulated quantities through the first bed, an air inlet for the chamber between the two fuel beds, and a final gas outlet for the chamber below the level of the top of the second fuel bed.

6. A gas producer comprising a chamber, means for forming a fuel bed at the top of the chamber, means for substantially continuously feeding fuel to the bed, adjustable means for controlling the rate of feed of the fuel, means for substantially continuously feeding all of the unconsumed solid fuel across the bed and dropping it all to the lower part of the chamber to form there a second fuel bed distinctly separated from the first bed and so related thereto that substantially all unconsumed gases from the first bed will be completely oxidized before reaching the second bed, adjustable means for passing air in regulated quantities through the first bed, an air inlet for the chamber below the second fuel bed, and a final gas outlet for the chamber below the level of the top of the second fuel bed.

7. A gas producer comprising a chamber, means for forming a fuel bed at the top of the chamber, means for substantially continuously feeding fuel to the bed, adjustable means for controlling the rate of feed of the fuel, means for substantially continuously feeding all of the unconsumed solid fuel across the bed and dropping it all to the lower part of the chamber to form there a second fuel bed distinctly separated from the first bed and so related thereto that substantially all unconsumed gases from the first bed will be completely oxidized before reaching the second bed, adjustable means for passing air in regulated quantities through the first bed, an air inlet for the chamber between the two fuel beds, another air inlet for the chamber below the second fuel bed, and a final gas outlet for the chamber below the level of the top of the second fuel bed.

8. A gas producer comprising a chamber, means for forming a fuel bed at the top of the chamber, means for substantially continuously feeding fuel to the bed, adjustable means for controlling the rate of feed of the fuel, means for substantially continuously feeding all of the unconsumed solid fuel across the bed and dropping it all to the lower part of the chamber to form there a second fuel bed distinctly separated from the first bed and so related thereto that substantially all unconsumed gases from the first bed will be completely oxidized before reaching the second bed, adjustable means for passing air in regulated quantities through the first bed, an air inlet for the chamber above the first fuel bed, an air inlet for the chamber below the first fuel bed and above the second fuel bed, another air inlet for the chamber below the second fuel bed, and a final gas outlet for the chamber below the level of the top of the second fuel bed.

9. A gas producer comprising a container, means for forming a fuel bed at one location, means for substantially continuously feeding fuel to the bed, adjustable means for controlling the rate of feed of the fuel, adjustable means for supplying air to the fuel bed in regulated quantities, means for removing all of the unoxidized portions of solid fuel from the fuel bed to another location to form at the second location a second fuel bed distinctly separated from the first bed and so related thereto that substantially all unconsumed gases from the first bed will be completely oxidized before reaching the second bed, and means for compelling the completely oxidized gases from the first bed to pass through the second bed.

10. A gas producer comprising a chamber, a grate in the chamber at the top of the chamber, means for substantially continuously feeding fuel to the grate to form thereon a fuel bed, adjustable means for controlling the rate of feed of the fuel, means for substantially continuously agitating the fuel during combustion, adjustable means for supplying air through the grate in regulated quantities, means for substantially continuously feeding all of the solid unconsumed portions of fuel across the bed and dropping it all to the lower part of the chamber to form there a second fuel bed distinctly separated from the first bed and so related thereto that substantially all unconsumed gases from the first bed will be completely oxidized before reaching the second bed, an air inlet for the chamber above the first fuel bed, an air inlet for the chamber below the first fuel bed and above the second fuel bed, another air inlet for the chamber below the second fuel bed, and a final gas outlet for the chamber below the top of the second fuel bed.

In testimony whereof I affix my signature in presence of two witnesses.

CHARLES E. LUCKE.

Witnesses:
WM. ASHLEY KELLY,
BERNARD HAHN.